W. H. MAXEY.
Tether.
No. 225,404. Patented Mar. 9, 1880.
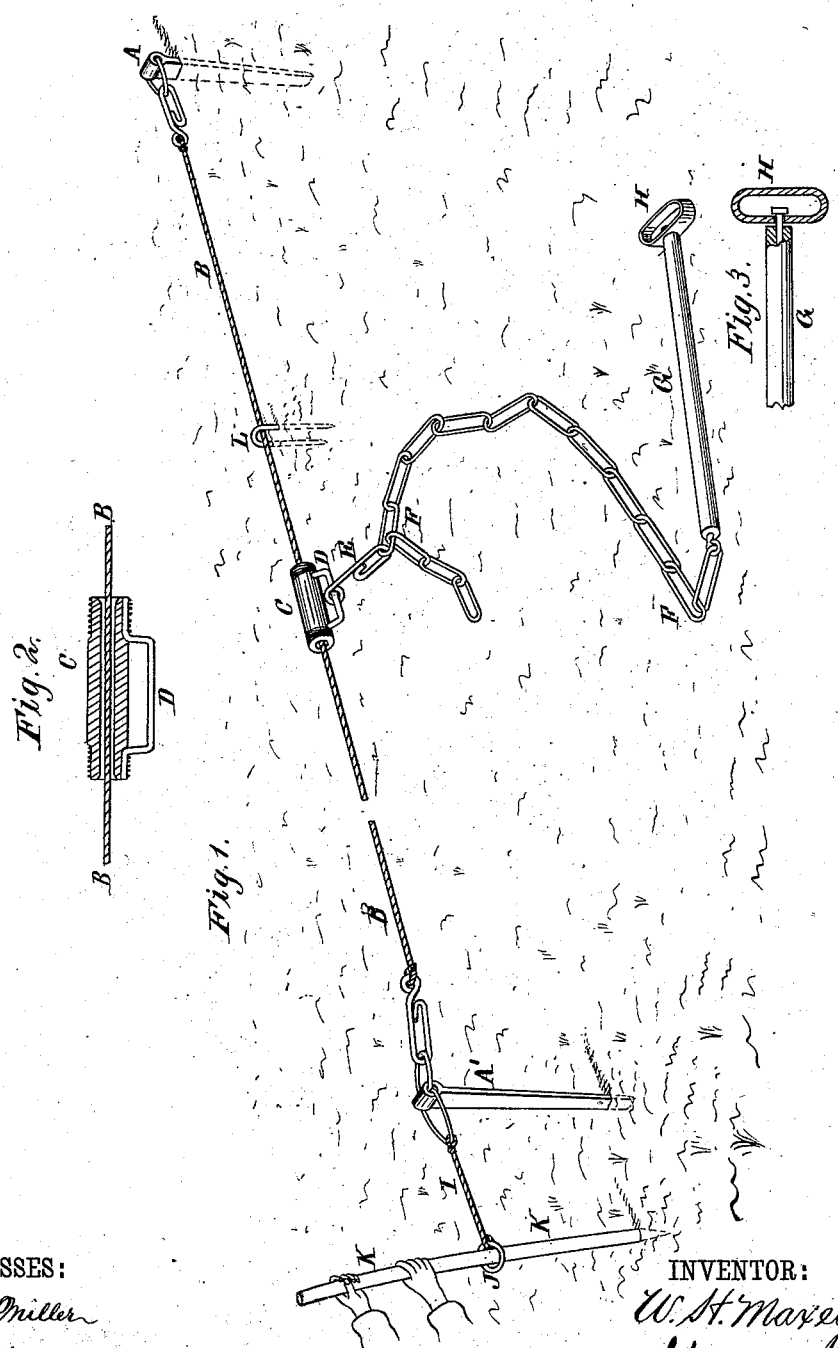
WITNESSES:
INVENTOR:
W. H. Maxey
BY
ATTORNEYS.

UNITED STATES PATENT OFFICE.

WILLIAM H. MAXEY, OF HOMER, LOUISIANA.

TETHER.

SPECIFICATION forming part of Letters Patent No. 225,404, dated March 9, 1880.

Application filed December 11, 1879.

*To all whom it may concern:*

Be it known that I, WILLIAM H. MAXEY, of Homer, in the parish of Claiborne and State of Louisiana, have invented a new and useful Improvement in Tethers, of which the following is a specification.

Figure 1 is a perspective view of my improvement. Fig. 2 is a sectional plan view of the slide. Fig. 3 is a side view of the connecting-bar, partly in section.

Similar letters of reference indicate corresponding parts.

The object of this invention is to furnish tethers for securing horses and other stock while grazing, so constructed as to prevent the animals from twisting the tethers or becoming entangled in them, and also to limit the grazing area without moving the tether.

The invention consists in combining a loop-bar, chain, staple, and slide-block with a rope stretched between two stakes, as hereinafter described.

A A' are two stakes, which I prefer to make flat to give them a firmer hold upon the ground. The stakes A A' are provided with rings at their upper ends, to which are attached, by means of snap-hooks or other suitable means, the ends of a rope, B.

The rope B may be of any desired length, and upon it is placed a sliding block, C, to which is attached a long staple, D. To the staple D is attached a snap-hook, E, or other fastening to receive the end of a chain, F, and allow the said chain to be lengthened and shortened, as may be required. To the other end of the chain F is attached the end of a bar, G, to the other end of which is swiveled a loop or flattened ring, H, to receive a strap or collar to be buckled around the animal's neck. With this construction the chain F will lie upon the ground by its own weight, and the bar G will keep the animal from entangling his legs in the said chain F as he moves about in grazing and in lying down and getting up, the swiveled loop H allowing the animal to turn around in any direction without twisting the chain F. With this construction, also, as the animal moves toward either end of the rope B the chain F slips to that end of the staple D, so that the block or slide C will slide easily upon the said rope B, and will not catch upon the ground.

To the stake A' is attached the end of a short rope or chain, I, which has a ring, J, attached to or a loop formed upon its other end.

In adjusting the tether, the stake A is forced into the ground, the rope B is extended, a stake or lever, K, is passed through the ring or loop J, and the rope B is drawn taut and held while the stake A' is forced into the ground with the foot or other suitable means.

The movement of the slide C upon the rope B, and consequently the space over which the animal grazes, may be limited by a staple or U-stake, L, forced into the ground over the rope B, as shown in Fig. 1, and which may be moved from one point to another, as required.

I am aware that it is not broadly new to tether a horse to a block that slides on a rope stretched between two stakes; but

What I claim is—

The combination of the stakes A A', having an eye and ring at the upper end, the rope B, connected with and stretched between said rings, the slide-block C, having staple D, the chain F, connected with said staple, and the loop-bar G H, as and for the purpose specified.

WILLIAM HUX. MAXEY.

Witnesses:
W. F. AYCOCK,
JAS. R. KEENER.